United States Patent [19]

Zeiher et al.

[11] Patent Number: 5,358,640
[45] Date of Patent: * Oct. 25, 1994

[54] METHOD FOR INHIBITING SCALE FORMATION AND/OR DISPERSING IRON IN REVERSE OSMOSIS SYSTEMS

[75] Inventors: E. H. Kelle Zeiher, Naperville; Cynthia A. Soderquist, Bolingbrook, both of Ill.

[73] Assignee: Nalco Chemical Company, Naperville, Ill.

[*] Notice: The portion of the term of this patent subsequent to Oct. 26, 2010 has been disclaimed.

[21] Appl. No.: 122,729

[22] Filed: Sep. 16, 1993

Related U.S. Application Data

[63] Continuation-in-part of Ser. No. 916,905, Jul. 20, 1992, Pat. No. 5,256,303.

[51] Int. Cl.$^5$ ................................ C02F 5/14
[52] U.S. Cl. .................... 210/639; 210/700; 210/701; 252/180
[58] Field of Search .......... 210/638, 639, 652, 698, 210/699, 700, 701; 252/180

[56] References Cited

U.S. PATENT DOCUMENTS

| | | | |
|---|---|---|---|
| 4,499,002 | 2/1985 | Masler, III et al. | 252/180 |
| 4,563,284 | 1/1986 | Amjad | 210/699 |
| 4,566,973 | 1/1986 | Masler, III et al. | 210/701 |
| 4,566,974 | 1/1986 | Masler, III et al. | 210/701 |
| 4,634,532 | 1/1987 | Logan et al. | 210/639 |
| 4,652,377 | 3/1987 | Amjad | 210/699 |
| 4,744,949 | 5/1988 | Hoots et al. | 422/15 |
| 4,752,443 | 6/1988 | Hoots et al. | 422/13 |
| 4,756,881 | 7/1988 | Hoots et al. | 422/13 |
| 4,762,621 | 8/1988 | Masler, III et al. | 210/701 |
| 4,784,774 | 11/1988 | Amjad et al. | 210/699 |
| 4,898,686 | 2/1990 | Johnson et al. | 252/389.2 |
| 4,904,413 | 2/1990 | Hoots et al. | 252/389.23 |
| 4,929,425 | 5/1990 | Hoots et al. | 422/13 |
| 4,936,987 | 6/1990 | Persinski et al. | 210/699 |
| 4,952,326 | 8/1990 | Amjad et al. | 210/701 |
| 4,952,327 | 8/1990 | Amjad et al. | 210/701 |
| 5,000,856 | 3/1991 | Chen et al. | 210/694 |
| 5,256,303 | 10/1993 | Zeiher et al. | 210/701 |

Primary Examiner—Peter A. Hruskoci
Attorney, Agent, or Firm—Robert A. Miller; Paul D. Greeley

[57] ABSTRACT

A method for inhibiting calcium sulfate scale formation and deposition and/or dispersing iron from a feedstream passing through a reverse osmosis system which comprises the steps of: controlling the pH of the feedstream within the range between about 6.0 to about 7.0; controlling the temperature of the feedstream within the range between about 50° to about 80° F.; and adding a scale inhibitor and/or iron dispersant to the feedstream in an amount between about 0.002 ppm per ppm hardness (as CaCO$_3$) of the feedstream to about 0.005 ppm per ppm hardness (as CaCO$_3$) of the feedstream, the scale inhibitor comprising a water-soluble organic phosphonate, an N-substituted acrylamide polymer, caustic and water.

17 Claims, 2 Drawing Sheets

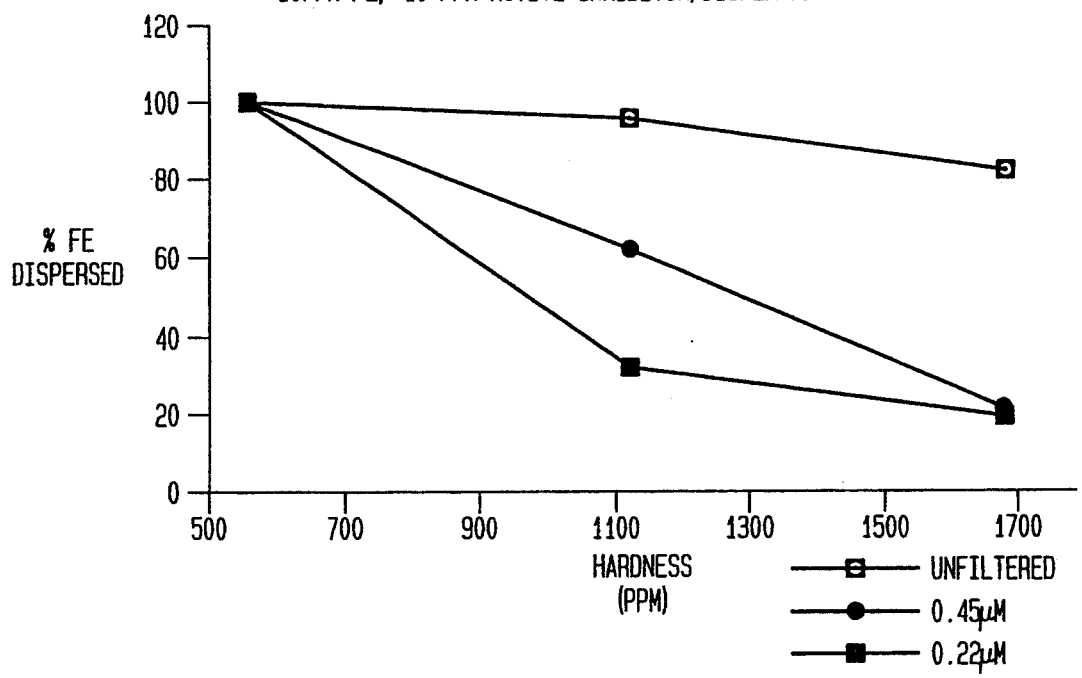
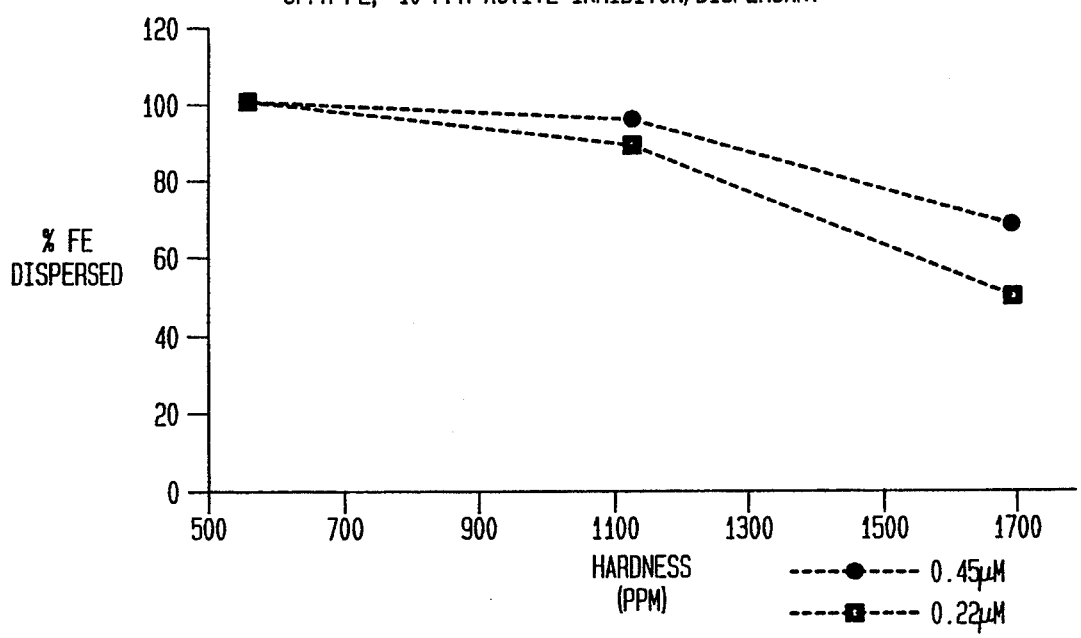

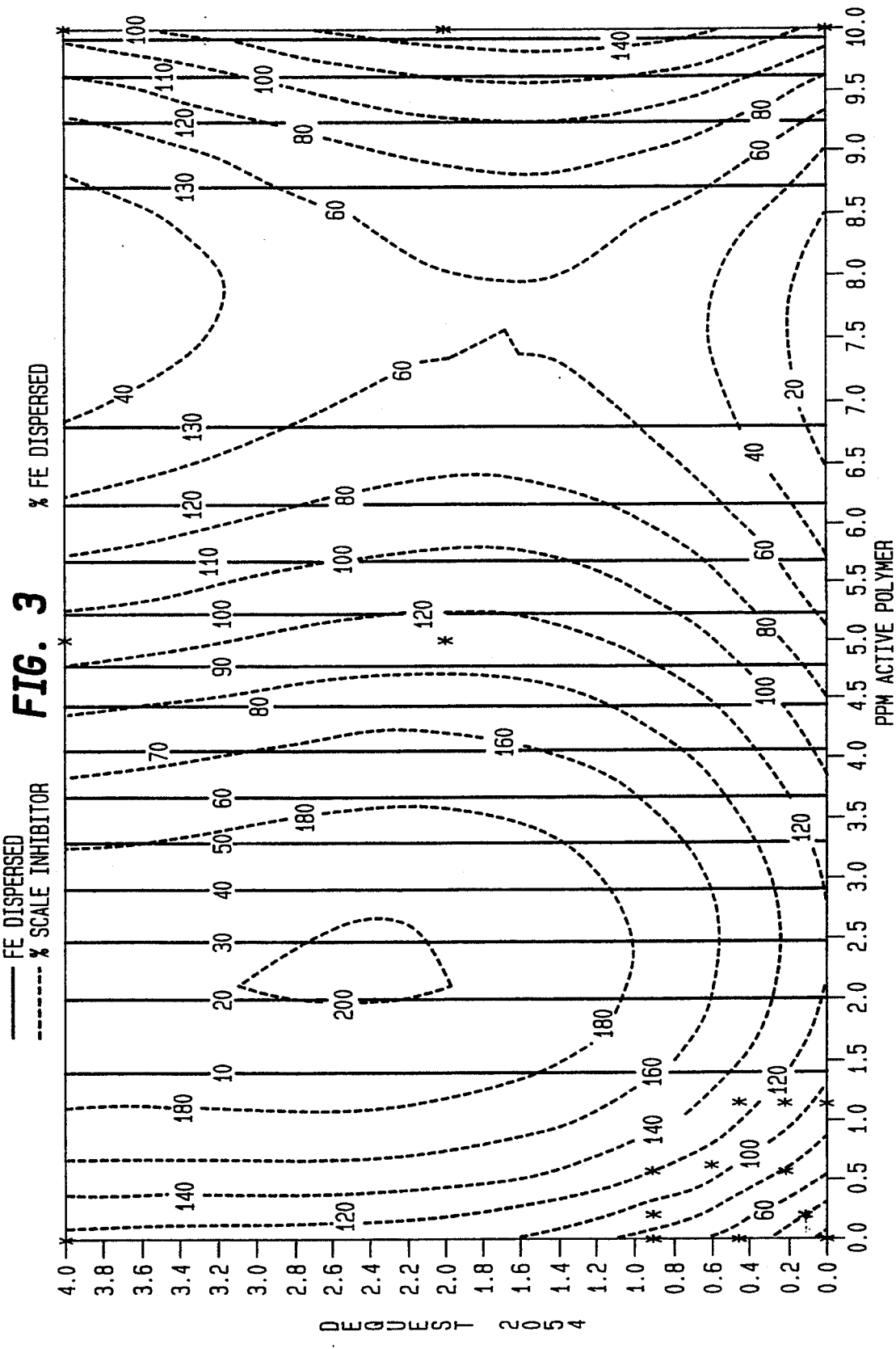

METHOD FOR INHIBITING SCALE FORMATION AND/OR DISPERSING IRON IN REVERSE OSMOSIS SYSTEMS

This application is a continuation-in-part of copending application Ser. No. 916,905 filed Jul. 20, 1992, now U.S. Pat. No. 5,256,303.

A method for inhibiting calcium sulfate scale formation and deposition and/or dispersing iron from a feedstream passing through a reverse osmosis system which comprises the steps of: controlling the pH of the feedstream; controlling the temperature of the feedstream; and adding a scale inhibitor and/or iron dispersant which comprises an acrylic acid/acrylamide/acrylamidomethylsulphonic acid terpolymer, a phosphonate, caustic and water to the feedstream.

BACKGROUND OF THE INVENTION

Purification of water by reverse osmosis (RO) is growing in popularity. Specifically, it is used for seawater desalination, potable water production, cooling tower make-up, process water generation, boiler feedwater pretreatment and the like. It offers the advantages of removing both organic and inorganic contaminants to yield water which is up to 98% pure. If ion exchange polishing is used downstream of the RO unit, it also saves money by reducing the frequency of demineralizer regenerations and their associated waste disposal costs.

The RO process consists of using pressure to drive water through a semipermeable membrane. As the pure water (permeate) passes through the salt rejecting layer of the membrane, the remaining water (retentate) is enriched in contaminants. A turbulence promoter, present within the membrane module, helps prevent the formation of large concentration gradients within the unit. Nevertheless, next to the barrier layer, an area of concentration polarization develops, and the concentrations of common scale forming salts such as $CaCO_3$ and $CaSO_4$ often exceed their solubility limits and precipitate on the surface. In addition, the presence of insoluble iron fines may also foul the membrane surface. Such scaling and fouling decreases the production of pure water. To regain the product water flow, higher driving pressures are necessary, which result in increased energy costs and potential damage to the membranes.

A significant operating cost factor of a reverse osmosis system is the cost of the membranes themselves. With proper care membranes can last for years before replacement becomes necessary. If the membranes experience fouling by deposits of material on their surface, this may result in increased energy consumption, or membrane failure which would ultimately cause an unscheduled shutdown and significant replacement costs. Most RO systems incorporate some type of pretreatment system consisting of filters to remove suspended matter which minimizes fouling. Also, chemical addition is often required to inhibit scaling. Foulants are softer, non-crystalline deposits, which adhere to the membrane surface and include: colloids, small particles, oil, biological growth, metal oxides, and silica. Mineral scales are hard, dense crystalline precipitates which include, but are not limited to, $CaCO_3$, $CaSO_4$, $BaSO_4$, $SrSO_4$, $CaF_2$, and $Mg(OH)_2$.

RO end users frequently employ chemical pretreatments such as the addition of polymeric scale inhibitors/dispersants to inhibit undesirable mineral scaling. In some cases, inorganic inhibitors such as sodium hexametaphosphate (SHMP) are used.

There are many types of scale inhibitors which have been used. For example U.S. Pat. No. 4,563,284 (Amjad), issued Jan. 7, 1986, discloses a method for inhibiting formation and deposition of scale-forming salts by adding thereto an effective threshold amount of a phosphonocarboxylic acid and a telomeric phosphinocarboxylic acid that contains features of both phosphonates and polyacrylates. U.S. Pat. No. 4,762,621 (Masler, III et al.), issued Aug. 9, 1988, discloses a scale inhibitor comprising a copolymer of an acrylic acid and a lower alkyl ester of itaconic acid. U.S. Pat. No. 4,784,774 (Amjad et al.), issued Nov. 15, 1988, discloses a scale inhibitor containing a homopolymer of maleic acid or a copolymer of a monounsaturated monocarboxylic or dicarboxylic acid or salt thereof containing 3 to 5 carbon atoms and a phosphonoalkane carboxylic acid. U.S. Pat. No. 4,952,327 (Amjad et al.), issued Aug. 28, 1990, discloses a scale inhibitor obtained by adding to an aqueous medium 0.5 to 500 ppm of a copolymer containing at least one of each of the following three monomers: (a) monounsaturated carboxylic acids as well as salts and anhydrides thereof such as acrylic acid, methacrylic acid, or maleic acid; (b) acrylamidoalkane sulfonic acids and salts thereof, such as 2-acrylamido-2-methylpropane sulfonic acid (AMPS ®, a registered trademark of the Lubrizol Corporation); and (c) styrene sulfonic acid and its salts. U.S. Pat. No. 4,652,377 (Amjad), issued Mar. 24, 1987, discloses a scale inhibitor comprised of a polyacrylic acid, phytic acid, and a phosphonocarboxylic acid containing at least one phosphono group, at least two carboxylic groups, and a hydrocarbon chain of at least two carbon atoms. U.S. Pat. No. 5,000,856 (Chen et al.), issued Mar. 19, 1991, a scale inhibitor which comprises (a) a maleic acid/allyl sulfonic acid copolymer, (b) an acrylic acid/acrylamidomethylpropyl sulfonic acid polymer, and a phosphonate such as hexamethylenediamine tetraphosphonic acid or 2-phosphonobutane-1,2,4-tricarboxylic acid, ammonium salt.

The present invention is directed to the use of a terpolymer of acrylic acid/acrylamide/sulfonated acrylamide in conjunction with a phosphonated product as scale inhibitor/iron dispersant in reverse osmosis systems. This novel antiscalant/dispersant has proven particularly effective in inhibiting $CaSO_4$ scale on RO membranes, as well as in dispersing of iron. The present inventors have developed a suitable dosage profile which demonstrated effective minimum dosages of this antiscalant/dispersant when used in RO systems. Also, the pH and temperature of the RO feedstream must be controlled in order to properly inhibit mineral scaling within the system.

The present invention also provides many additional advantages which shall become apparent as described below.

SUMMARY OF THE INVENTION

A method for inhibiting calcium sulfate scale formation and deposition and/or dispersing iron from a feedstream passing through a reverse osmosis system which comprises the steps of: controlling the pH of the feedstream within the range between about 6.0 to about 7.0; controlling the temperature of said feedstream within the range between about 50° to about 80° F.; and adding a scale inhibitor to the feedstream in an amount between about 0.002 ppm per ppm hardness (as $CaCO_3$) of the feedstream to about 0.005 ppm per ppm hardness (as CaCO3) of the feedstream. The scale inhibitor preferably comprises a water-soluble organic phosphonate and an N-substituted acrylamide polymer containing an amide structure as follows:

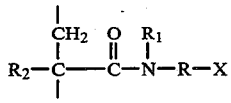

where R2 is hydrogen or methyl, R1 is a hydrogen or an alkyl, and R is alkylene or phenylene and X is sulfonate, (poly) hydroxyl, (poly) carboxyl or carbonyl, and combinations thereof, with the weight ratio of polymer to phosphonate being within the range of about 0.2:1 to about 6:1.

The organic phosphonate is preferably selected from the group consisting of: 2-phosphonobutane-1,2,4-tricarboxylic acid and nitrilophosphonic acids (e.g., [hexamethylene bis(nitrilodimethylene)]-tetraphosphonic acid, hexapotassium salt). One preferred composition is an organic phosphonate of 2-phosphonobutane-1,2,4-tricarboxylic acid, an N-substituted acrylamide polymer, a caustic capable of neutralizing to pH of 6–7, and water.

This unique polymer composition can also be used as an iron dispersant to disperse iron disposed in a feedstream passing through a reverse osmosis system. It is preferable that the active iron dispersant to iron ratio be about 0.6:1 or greater.

Other and further objects, advantages and features of the present invention will be understood by reference to the following specification.

BRIEF DESCRIPTION OF THE DRAWINGS

FIG. 1 is a graph plotting % Fe dispersed verses hardness (as CaCO3) of a feedstream for a constant dosage of iron (10 ppm) and a scale inhibitor (based on polymer actives) which comprises an acrylic acid/acrylamide/acrylamidomethyl-sulphonic acid terpolymer and [hexamethylene bis(nitrilodimethylene)]-tetraphosphonic acid, hexapotassium salt;

FIG. 2 is a graph plotting % Fe dispersed verses hardness (as CaCO3) of a feedstream for a constant dosage of iron (5 ppm) and a scale inhibitor (based on polymer actives) which comprises an acrylic acid/acrylamide/acrylamidomethyl-sulphonic acid terpolymer and [hexamethylene bis(nitrilodimethylene)]-tetraphosphonic acid, hexapotassium salt; and FIG. 3 is a contour plot showing % Fe dispersed and % CaSO4 inhibition for various ratios of active phosphonate and polymers.

DESCRIPTION OF THE PREFERRED EMBODIMENTS

It has been found that post-polymerization derivatized hydrocarbon polymers can be used in conjunction with phosphonates to provide very effective scale inhibiting formulations for feedstreams processed in reverse osmosis systems to remove salts therefrom. Test results show these materials have synergistic effects which enhance the scale inhibition of each independent component. This scale inhibitor is also capable of dispersing iron contained within a feedwater (i.e., iron dispersancy or iron stabilization).

A preferred scale inhibitor according to the present invention comprises a water-soluble organic phosphonate and an N-substituted acrylamide polymer containing an amide structure. The N-substituted acrylamide polymer is preferably as follows:

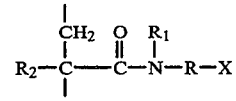

where R2 is hydrogen or methyl, R1 is a hydrogen or an alkyl, and R is alkylene or phenylene and X is sulfonate, (poly) hydroxyl, (poly) carboxyl or carbonyl, and combinations thereof, with the weight ratio of polymer to phosphonate being within the range of about 0.2:1 to about 6:1.

The term "phosphonate" refers to organic materials containing one or more —PO3H2 groups and salts thereof. The term "acryl" includes the term "methacryl".

One example of an N-substituted acrylamide polymer is a terpolymer of acrylic acid/acrylamide/acrylamidomethysulfonic acid having a mole ratio of acrylic acid to acrylamide to acrylamidomethylsulphonic acid within the range between about 13–95 to about 0–73 to about 5–41, respectively; and wherein the polymer has a weight average molecular weight within the range of about 7,000 to about 82,000. More preferably, the terpolymer has a mole ratio of acrylic acid to acrylamide to acrylamidomethylsulphonic acid within the range of about 40–90 to about 0–50 to about 10–40, respectively; and wherein the polymer has a weight average molecular weight within the range of about 10,000 to about 40,000.

The preferred organic phosphonate is selected from the group consisting: of 2-phosphonobutane-1,2,4-tricarboxylic acid and nitrilophosphonic acids. One preferred nitrilophosphonic acid is [hexamethylene bis(nitrilodimethylene)]-tetraphosphonic acid, hexapotassium salt.

The invention is also directed to a method for dispersing and maintaining dispersed particulate or inorganic matter, particularly iron oxide and clay, in an aqueous medium containing such matter and/or for controlling the deposition of scale-imparting precipitates on surfaces of equipment used in recirculating or the once-through water systems containing such precipitates, or precipitate-forming ions, under conditions which form the precipitates. This method is particularly effective for inhibiting calcium sulfate scale formation and deposition from a feedstream passing through a reverse osmosis system disposed within a plant for use in providing boiler feedwater, cooling tower make-up water, purified process water, potable water, or for use in the desalination of seawater or the like. The reverse osmosis system is capable of purifying water from brine solutions or brackish waters containing a high concentration of salts.

This method comprises the steps of: controlling the pH of the feedstream within the range between about 6.0 to about 7.0; controlling the temperature of the feedstream within the range between about 50° to about 80° F.; and adding a scale inhibitor to the feedstream. The scale inhibitor is preferably added at a minimum concentration of about 0.002 ppm per ppm hardness (as $CaCO_3$) to a maximum concentration of about 0.005 ppm per ppm hardness (as $CaCO_3$) of the feedstream. The scale inhibitor is preferably added to the feedstream at a minimum of about 0.3 to a maximum of about 20 ppm polymer actives. It is possible that the antiscalant may be used in an amount less than 0.3 ppm polymer actives, in some cases.

The pH of the feedstream is controlled by the use of sulfuric acid in an amount such that only $CaSO_4$ is precipitated, not $CaCO_3$. The pH of the feedstream is preferably controlled within the range between about 6.0 to about 7.0, most preferably such that it does not exceed 6.5.

When iron is contained within a feedstream passing through a reverse osmosis system it can be dispersed by the steps of: controlling the pH of the feedstream within the range between about 6.0 to about 8.5; controlling the temperature of the feedstream within the range between about 30° to about 80° F.; and adding an iron dispersant to the feedstream. The iron dispersant to iron ratio is approximately 0.5:1 or greater.

THE DERIVATIZED POLYMERS

The polymers of this invention have been prepared by post-polymerization derivatization. The derivatizing agents of the invention are hydrocarbon groups containing both an amino functionality and at least one of the following groups:

1. (poly)hydroxy alkyl(aryl);
2. alkyl and aryl(poly)carboxylic acids and ester analogues;
3. aminoalky(aryl) and quaternized amine analogues;
4. halogenated alkyl(aryl);
5. (poly)ether alkyl(aryl);
6. (di)alkyl;
7. alkyl phosphonic acid;
8. alkyl keto carboxylic acid;
9. hydroxyalkyl sulfonic acid; and
10. (aryl)alkyl sulfonic acid, wherein the prefix "poly" refers to two or more such functionalities.

The derivatization process of the invention includes direct amidation of polyalkyl carboxylic acids and transamidation of copolymers containing carboxylic acid and (meth)acrylamide units.

Particularly advantageous are polymers of the present invention containing sulfomethylamide (AMS), sulfoethylamide (AES), sulfophenylamide (APS), 2-hydroxy-3-sulfopropylamide (HAPS) and 2,3-dihydroxypropylamide units which are produced by transamidation using acrylic acid (AA) or acrylamide (Am) homopolymers and copolymers, including terpolymers, which have a mole percent of acrylamide or homologous units of a minimum of about 10%. The transamidation is achieved using such reactants as aminomethanesulfonic acid, 2-aminoethanesulfonic acid (taurine, 2-AES), 4-aminobenzenesulfonic acid (p-sulfanilic acid), 1-amino-2-hydroxy-3-propanesulfonic acid, or 2,3-dihydroxypropylamine in aqueous or like polar media at temperatures on the order of about 150° C. Once initiated, the reactions go essentially to completion.

Other particularly advantageous polymeric sulfonates of the present invention are produced by an addition reaction between an aminosulfonic acid, such as sulfanilic acid, and taurine, or their sodium salts, and a copolymer of maleic anhydride and a vinylic compound such as styrene, methyl vinyl ether, or (meth)acrylamide.

THE PHOSPHONATES

Generally any water-soluble phosphonate may be used that is capable of providing scale inhibition in acidified systems. See U.S. Pat. Nos. 4,756,881 (Hoots et al.), issued Jul. 12, 1988, and 4,929,425 (Hoots et al.), issued May 29, 1990, which refer to a number of representative phosphonates. As such, the subject matter of U.S. Pat. Nos. 4,756,881 and 4,929,425 are incorporated herein by reference.

Preferred phosphonates, however, are selected from the group consisting of: 2-phosphonobutane-1,2,4-tricarboxylic acid; and nitrilophosphonic acids (e.g., [hexamethylene bis(nitrilodimethylene)]-tetraphosphonic acid, hexapotassium salt).

Scale inhibitors can be used in applications other than purification of boiler feedwater, cooling tower makeup, process water, potable water and seawater desalination where calcium scaling is a major consideration. Particular applications contemplated herein are flash distillation, oil field applications, pulp digesters, phosphoric acid production, sugar evaporators, and the like.

Scale formation occurs when the concentrations of species, such as calcium and magnesium, exceed the solubility constants of their sparingly soluble salts. The factors which affect scale formation include: temperature, pH, and competitive equilibria. In order to demonstrate the effectiveness of the scale inhibitor/dispersant polymer of the present invention versus conventional antiscalant treatment programs, the present inventors have conducted the following experiments.

EXAMPLE 1

The following is an experimental design demonstrating the optimization of the scale inhibitor of the present invention. The scale inhibitor is a compound comprising a terpolymer of acrylic acid/acrylamide/acrylamidomethylsulphonic acid (50:30:20) and [hexamethylene bis(nitrilodimethylene)]-tetraphosphonic acid, hexapotassium salt (sold under the tradename Dequest 2054 by Monsanto). The results are set forth below in Table 1.

TABLE 1

| Run No. | Terpolymer (ppm active) | Dequest 2054 (ppm active) | Inhibition (%) | Fe Dispersed (%) |
|---|---|---|---|---|
| 1 | 0.57 | 0.22 | 107 | 1.6 |
| 2 | 0.00 | 4.0 | 110 | 98.6 |
| 3 | 0.00 | 4.00 | 103 | 1.0 |
| 4 | 1.14 | 0.00 | 92 | 4.7 |
| 5 | 5.00 | 4.00 | 106 | 93.1 |
| 6 | 0.19 | 0.90 | 103 | 0.5 |
| 7 | 0.00 | 0.45 | −4 | 0.5 |
| 8 | 0.00 | 0.90 | 124 | 1.1 |
| 9 | 10.00 | 2.00 | 130 | 100.0 |
| 10 | 1.14 | 0.45 | 105 | 10.4 |
| 11 | 1.14 | 0.00 | 99 | 5.5 |
| 12 | 1.14 | 0.22 | 116 | 10.7 |
| 13 | 0.00 | 0.00 | 0 | 1.0 |
| 14 | 5.00 | 2.00 | 135 | 96.3 |
| 15 | 0.64 | 0.60 | 113 | 0.4 |
| 16 | 10.00 | 0.00 | 117 | 94.8 |
| 17 | 1.14 | 0.45 | 111 | 2.3 |
| 18 | 0.57 | 0.90 | 122 | 0.4 |
| 19 | 10.00 | 0.00 | 122 | 96.6 |
| 20 | 10.00 | 4.00 | 119 | 92.9 |
| 21 | 0.38 | 0.11 | 109 | 0.9 |
| 22 | 0.19 | 0.11 | 0 | 1.3 |
| 23 | 0.00 | 4.00 | 117 | 2.1 |

TABLE 1-continued

| Run No. | Terpolymer (ppm active) | Dequest 2054 (ppm active) | Inhibition (%) | Fe Dispersed (%) |
|---|---|---|---|---|
| 24 | 0.57 | 0.90 | 119 | 1.5 |

The results from Table 1 above were fitted to a predictive model using a standard experimental design software package such as RS/1 marketed by BBN Software Products. Based on this model, contour plots showing % Fe dispersion and % CaSO₄ inhibition were generated on FIG. 3. Nearly all of the combinations in table 1 dispersed CaSO₄, but not all were capable of dispersing iron.

EXAMPLE 2

A scale inhibitor/iron dispersant in accordance with the present invention, i.e., a terpolymer of acrylic acid-/acrylamide/acrylamidomethylsulphonic acid (50:30:20) and [hexamethylene bis(nitrilodimethylene)]-tetraphosphonic acid, hexapotassium salt (sold under the tradename Dequest 2054), was tested for iron dispersancy at varying dosage and hardness levels. At 10 ppm active, 10 ppm Fe, and standard condition (560 ppm) hardness, the product achieved 100% iron dispersion. The particle size of the dispersed iron is $<0.22\mu$. As the level of hardness was increased, the particle agglomeration increased so that at 1680 ppm hardness, only 19% Fe is $<0.22\mu$. If the initial iron was decreased, a proportional decrease in particle size was observed. CaSO₄ scale was not observed under the conditions of this test.

EXAMPLE 3

Iron dispersion experiments were run using a scale inhibitor which comprises a terpolymer of acrylic acid-/acrylamide/acrylamidomethylsulphonic acid (50:30:20) and [hexamethylene bis(nitrilodimethylene)]-tetraphosphonic acid, hexapotassium salt (sold under the tradename Dequest 2054 by Monsanto). It was the purpose of these experiments to examine the dosage and effect of hardness and iron form on dispersion ability. An Iron hydroxide test set forth below in Table 2 was conducted at a pH of 8.5, 300 ppm Ca (as CaCO₃), 260 ppm Mg (as CaCO₃), 10 ppm Fe, 10 ppm active treatment, at a temperature of 60° C. for 2 hours, and then at room temperature for 24 hours.

TABLE 2

| Treatment (ppm) | Supernatant % Fe | 0.45 μm Filtrate % Fe | 0.22 μm Filtrate % Fe |
|---|---|---|---|
| 10 | 100 | 100 | 100 |
| 8 | 101 | 100 | 87 |
| 6 | 104 | 90 | 42 |

100% iron dispersion was achieved with as low as 5 ppm product. However, particle size was increased as dosage was decreased.

FIGS. 1 and 2, attached hereto, examine the effect of hardness level on dispersion. From FIGS. 1 and 2, although 100% dispersion was maintained, particle size increases. This makes sense in that the product has a stronger affinity for the hardness than for the iron. As the hardness increases it consumes treatment, which in turn means that less treatment is available for controlling the Fe particle size.

EXAMPLE 4

A scale inhibitor/iron dispersant formulation according to the present invention was prepared from 0.38 ppm acrylic acid/acrylamide/acrylamidomethylsulphonic acid (50:30:20) and 0.15 ppm [hexamethylene bis(nitrilodimethylene)]-tetraphosphonic acid, hexapotassium salt. This formula consisted of an aqueous solution containing 20.2% of a 37% solution of acrylic acid/acrylamide/acrylamidomethylsulphonic acid solution (7.9% actives based on total polymer in solution), 8.34% of a 35% solution of [hexamethylene bis(nitrilodimethylene)]-tetraphosphonic acid, hexapotassium salt solution (3% actives based on total polymer in solution), and 1.6% of a 50% NaOH solution; the formula was at a pH of 6.5. This scale inhibitor/iron dispersant formulation achieved 100% CaSO₄ inhibition under test conditions of 2,000 ppm Ca. This formula was also tested for iron dispersancy and not only achieved 100% iron dispersed, but maintains particle size under 0.22 m at a dosage of 1 ppm actives/ppm Fe.

EXAMPLE 5

A scale inhibitor/iron dispersant formulation was prepared using 27% of a 37% solution of acrylic acid/acrylamide/acrylamido-methylsulphonic acid solution (10% actives based on total polymer in solution), 5.8% of 35% solution of [hexamethylene bis(nitrilodimethylene)]-tetraphosphonic acid, hexapotassium salt (2% actives based on total polymer in solution), 3.2% of a NaOH solution and the remainder being water.

EXAMPLE 6

The procedure used in the following demonstration was devised to examine CaSO₄, Ca₃(PO₄)₂, and CaCO₃ scale formation. In general, solutions of an inhibitor (generally between 5-50 ppm) and anions (e.g., $SO_4^{-2}$, $PO_4^{-3}$, and $CO_3^{-2}$) were prepared and adjusted with caustic to a specific pH. These solutions were equilibrated at the specified temperature and pH for 45 minutes. After the conditioning period, the calcium solution (i.e., a solution of CaCl₂. 2H₂O) was added. This final solution was maintained at the specified temperature and pH for 20 hours. The pH was controlled by automatic addition of 0.1N NaOH with a peristaltic pump controlled by a pH controller.

The antiscalant screening assembly used in this experiment consisted of a temperature controlled bath equipped with a magnetic stirring device. Each of the cells in the bath was equipped with a stir bar, a NaOH feed tube, and a pH electrode interfaced to the NaOH feed via a pH controller. Each cell was covered to minimize evaporation. Samples were withdrawn at Time=0 and 20 hours, filtered through 0.22μ filters and analyzed for calcium using standard known methods. For comparative purposes, the ability to inhibit scale formation and deposition is expressed as % Inhibition (%I) which is calculated by the following formula:

$$\% \text{ Inhibition} = \left( \frac{(\text{Ion})\text{exp} - (\text{Ion})\text{Blank Final}}{(\text{Ion})\text{initial} - (\text{Ion})\text{Blank Final}} \right) \times 100$$

where, (Ion)exp is the concentration of ion in the filtrate in the presence of polymer at Time (t), (Ion)Blank Final is the concentration of ion in the filtrate of the blank at Time (t), and (Ion)initial is the initial concentration of ion at Time zero.

Various tests were run to examine product effect on CaSO₄ inhibition. Sample 1 is the formulation according to one embodiment of the present invention wherein the scale inhibitor/dispersant comprises acrylic acid/acrylamide/acrylamidomethylsulphonic acid (50:30:20) and [hexamethylene bis(nitrilodimethylene)]-tetraphosphonic acid, hexapotassium salt. Sample 2 is 2-phosphonobutane-1,2,4-tricarboxylic acid (PBTC), alone. Sample 3 is acrylic acid/acrylamide/acrylamidomethylsulphonic acid (50:30:20), alone. Sample 4 is acrylic acid/acrylamide/acrylamidomethylsulphonic acid (50:30:20) and PBTC. Sample 5 is [hexamethylene bis(nitrilodimethylene)]-tetraphosphonic acid, hexapotassium salt, sold by Monsanto under the trademark Dequest 2054. Sample 6 is aminotri(methylene phosphonic acid), sold by Monsanto under the trademark Dequest 2000. The results are set forth below in Table 3.

TABLE 3

| Sample No. | ppm Active Phosphonate | ppm Product Terpolymer | % I ± 1% |
|---|---|---|---|
| 1 | 0.15 | 0.38 | 100 |
| 1 | 0.15 | 0.76 | 101 |
| 1 | 0.3 | 0.38 | 99 |
| 1 | 0.3 | 0.76 | 101 |
| 1 | 0.6 | 0.38 | 101 |
| 1 | 0.6 | 0.76 | 104 |
| 1 | 0.9 | 0.38 | 102 |
| 1 | 0.9 | 0.76 | 104 |
| 2 | 0.90 | 0 | 11 |
| 2 | 0.90 | 0 | 10 |
| 2 | 1.20 | 0 | 10 |
| 3 | 0 | 1.14 | 11 |
| 3 | 0 | 1.14 | 11 |
| 3 | 0 | 1.14 | 10 |
| 3 | 0 | 4.00 | 97 |
| 3 | 0 | 10.00 | 95 |
| 4 | 0.30 | 0.76 | 10 |
| 4 | 0.60 | 0.76 | 12 |
| 4 | 0.60 | 0.76 | 105 |
| 4 | 0.90 | 0.76 | 98 |
| 4 | 1.20 | 0.76 | 98 |
| 4 | 0.30 | 1.13 | 93 |
| 4 | 0.60 | 1.14 | 99 |
| 4 | 0.90 | 1.13 | 96 |
| 4 | 0.30 | 1.52 | 15 |
| 5 | 0.60 | 0 | 10 |
| 5 | 0.90 | 0 | 101 |
| 6 | 0.60 | 0 | 10 |
| 6 | 0.90 | 0 | 17 |

Where the aminotri(methylene phosphonic acid) was ineffective at inhibiting CaSO₄ scale, the [hexamethylene bis(nitrilodimethylene)]-tetraphosphonic acid, hexapotassium salt achieves 100% inhibition. Also sample 1 which combines [hexamethylene bis(nitrilodimethylene)]-tetraphosphonic acid, hexapotassium salt and acrylic acid/acrylamide/acrylamidomethylsulphonic acid demonstrated excellent CaSO₄ scale inhibition with as little as 0.15 ppm phosphonate and 0.38 ppm of the terpolymer. Sample 4 which combines PBTC and acrylic acid/acrylamide/acrylamidomethylsulphonic acid also demonstrated excellent CaSO₄ scale inhibition with as little as 0.30 ppm phosphonate and 1.13 ppm of the terpolymer. A dosage of 0.9 ppm of [hexamethylene bis(nitrilodimethylene)]-tetraphosphonic acid, hexapotassium salt, alone, was required to attain 100% scale inhibition. Other phosphonates such as Dequest 2000 and PBTC were unable to attain 100% scale inhibition even at dosages of 0.9 ppm.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A method for inhibiting calcium sulfate scale formation and deposition from a feedstream passing through a reverse osmosis system which comprises the steps of:

a. controlling the pH of said feedstream within the range between about 6.0 to about 7.0;

b. controlling the temperature of said feedstream within the range between about 50° to about 80° F.; and c. adding a scale inhibitor to said feedstream in an amount between about 0.002 ppm per ppm hardness (as CaCO₃) of said feedstream to about 0.005 ppm per ppm hardness (as CaCO₃) of said feedstream, said scale inhibitor comprising a water-soluble organic phosphonate of (hexamethylene bis(nitrilodimethylene))-tetraphosphonic acid or salts thereof and an N-substituted acrylamide polymer containing an amide structure as follows:

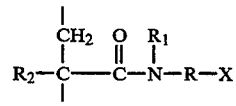

where $R_2$ is hydrogen or methyl, $R_1$ is a hydrogen or an alkyl, and R is alkylene or phenylene and X is sulfonate, (poly)hydroxyl, (poly)carboxyl or carbonyl, and combinations thereof, with the weight ratio of polymer to phosphonate being within the range of about 0.2:1 to about 6:1.

2. The method according to claim 1 wherein said N-substituted acrylamide polymer is an acrylic acid/acrylamide/acrylamidomethylsulphonic acid polymer or salt thereof having a mole ratio of acrylic acid to acrylamide to acrylamidomethylsulphonic acid within the range between about 13-95 to about 0-73 to about 5-41, respectively; and wherein the polymer has a weight average molecular weight within the range of about 7,000 to about 82,000.

3. The method according to claim 2 wherein said polymer has a mole ratio of acrylic acid to acrylamide to acrylamidomethylsulphonic acid within the range of about 40-90 to about 0-50 to about 10-40, respectively; and wherein said polymer has a weight average molecular weight within the range of about 10,000 to about 40,000.

4. The method according to claim 3 wherein said polymer has a mole ratio of acrylic acid to acrylamide to acrylamidomethylsulphonic acid of 50:30:20.

5. The method according to claim 1 wherein said scale inhibitor consists essentially of: an organic phosphonate of [hexamethylene bis(nitrilodimethylene)]-tetraphosphonic acid or salts thereof, said N-substituted acrylamide polymer, a caustic capable of neutralizing to pH of 6-7, and water.

6. The method according to claim 1 wherein the pH of the feedstream is controlled by the use of sulfuric acid in an amount such that only CaSO₄ is precipitated, not CaCO₃.

7. The method according to claim 1 wherein said scale inhibitor is added to said feedstream in an amount between about 0.3 to about 20 ppm polymer actives.

8. The method according to claim 1 wherein the pH of the feedstream is not greater than 6.5.

9. A method for dispersing iron disposed in a feedstream passing through a reverse osmosis system which comprises the steps of:
   a. controlling the pH of said feedstream within the range between about 6.0 to about 8.5;
   b. controlling the temperature of said feedstream within the range between about 30° to about 80° F.; and
   c. adding an iron dispersant to said feedstream, said iron dispersant comprising a water-soluble organic phosphonate of (hexamethylene bis(nitrilodimethylene))-tetraphosphonic acid or salts thereof and an N-substituted acrylamide polymer containing an amide structure as follows:

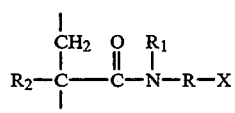

where $R_2$ is hydrogen or methyl, $R_1$ is a hydrogen or an alkyl, and R is alkylene or phenylene and X is sulfonate, (poly)hydroxyl, (poly)carboxyl or carbonyl, and combinations thereof, with the weight ratio of polymer to phosphonate being within the range of about 0.2:1 to about 6:1.

10. The method according to claim 9 wherein said N-substituted acrylamide polymer is an acrylic acid/acrylamide/acrylamidomethylsulphonic acid polymer or salts thereof having a mole ratio of acrylic acid to acrylamide to acrylamidomethylsulphonic acid within the range between about 13–95 to about 0–73 to about 5–41, respectively; and wherein the polymer has a weight average molecular weight within the range of about 7,000 to about 82,000.

11. The method according to claim 10 wherein said polymer has a mole ratio of acrylic acid to acrylamide to acrylamidomethylsulphonic acid within the range of about 40–90 to about 0–50 to about 10–40, respectively; and wherein said polymer has a weight average molecular weight within the range of about 10,000 to about 40,000.

12. The method according to claim 11 wherein said polymer has a mole ratio of acrylic acid to acrylamide to acrylamidomethylsulphonic acid of 50:30:20.

13. The method according to claim 9 wherein said iron dispersant consists essentially of: an organic phosphonate of [hexamethylene bis(nitrilodimethylene)]-tetraphosphonic acid or salts thereof, said N-substituted acrylamide polymer, a caustic capable of neutralizing to pH of 6–7, and water.

14. The method according to claim 9 wherein said iron dispersant is added to the feedstream in a ratio of dispersant to iron of about 0.5:1 or greater.

15. A method for inhibiting calcium sulfate scale formation and for dispersing iron from a feedstream passing through a reverse osmosis system which comprises the steps of:
   a. controlling the pH of said feedstream within the range between about 6.0 to about 7.0;
   b. controlling the temperature of said feedstream within the range between about 50° to about 80° F.; and
   c. adding a product polymer capable of both inhibiting scale formation/deposition and dispersing iron to said feedstream in an amount between about 0.002 ppm per ppm hardness (as $CaCO_3$) of said feedstream to about 0.005 ppm per ppm hardness (as $CaCO_3$) of said feedstream, said product polymer comprising a water-soluble organic phosphonate of (hexamethylene bis(nitrilodimethylene))-tetraphosphonic acid or salts thereof and an N-substituted acrylamide polymer containing an amide structure as follows:

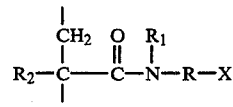

where $R_2$ is hydrogen or methyl, $R_1$ is a hydrogen or an alkyl, and R is alkylene or phenylene and X is sulfonate, (poly)hydroxyl, (poly)carboxyl or carbonyl, and combinations thereof, with the weight ratio of polymer to phosphonate being within the range of about 0.2:1 to about 6:1.

16. The method according to claim 15 wherein said product polymer is added to the feedstream in a ratio of product polymer to iron of about 0.5:1 or greater.

17. The method according to claim 15 wherein said scale inhibitor consists essentially of: an organic phosphonate of [hexamethylene bis(nitrilodimethylene)]-tetraphosphonic acid or salts thereof, said N-substituted acrylamide polymer, a caustic capable of neutralizing to pH of 6–7, and water.

* * * * *